United States Patent
Maurer et al.

[15] 3,659,915
[45] May 2, 1972

[54] FUSED SILICA OPTICAL WAVEGUIDE

[72] Inventors: Robert D. Maurer; Peter C. Schultz, both of Painted Post, N.Y.

[73] Assignee: Corning Glass Works, Corning, N.Y.

[22] Filed: May 11, 1970

[21] Appl. No.: 36,109

[52] U.S. Cl............................350/96 WG, 65/30, 65/DIG. 7, 65/DIG. 8
[51] Int. Cl............................................G02b 5/14, H01p 3/00
[58] Field of Search ............................350/96 WG, 175 GN

[56] References Cited

UNITED STATES PATENTS

| 3,542,536 | 11/1970 | Flam et al. | 350/96 WG X |
| 3,445,785 | 5/1969 | Koester et al. | 350/96 WG UX |
| 3,533,013 | 10/1970 | Seitz | 350/175 GN X |

*Primary Examiner*—John K. Corbin
*Attorney*—Clarence R. Patty, Jr. and Walter S. Zebrowski

[57] ABSTRACT

An optical waveguide having a high purity fused silica cladding layer, and a core of high plurality fused silica doped with a sufficient amount of a multivalent metal oxide so as to increase the index of refraction of the core above that of the cladding layer.

10 Claims, 2 Drawing Figures

Patented May 2, 1972 3,659,915

INVENTORS
ROBERT D. MAURER,
PETER C. SCHULTZ

BY Walter S. Zebrowski
ATTORNEY

FUSED SILICA OPTICAL WAVEGUIDE

BACKGROUND OF THE INVENTION

1. Field of the Invention

The increase in the amount of traffic that communication systems are required to handle has forced the development of high capacity systems. The presently used systems which operate between $10^4$ hz and $10^9$ hz, although relatively new, have already become saturated in some frequency bands due to excessive traffic. To allow for needed increases in traffic which the present systems cannot accommodate, commercial communication groups are presently installing high capacity systems that operate between $10^9$ hz and $10^{12}$ hz. Even with the increased capacity that these new systems will offer, traffic growth is so rapid that saturation of such systems is anticipated in the very near future. Therefore, to accommodate even more traffic higher capacity communication systems operating around $10^{15}$ hz are needed. These systems will hereinafter be referred to as "optical communication systems" since $10^{15}$ hz is within the frequency spectrum of light. Waveguides are desirable for effective transmission of information by systems operating at frequencies above $10^9$ hz. Systems operating at frequencies between $10^9$ hz and $10^{12}$ hz normally use electrical conductive waveguides as a transmitting medium. However, conventional electrical conductive waveguides are not satisfactory for transmitting information at frequencies around $10^{15}$ hz.

2. Description of the Prior Art

Producing a satisfactory transmitting media for frequencies around $10^{15}$ hz has been one of the more difficult problems in the development of an effective optical communication system. Such transmitting media are hereinafter referred to as "optical waveguides." To be an effective transmitting media for an optical communication system an optical waveguide should transmit light without excessive attenuation and should not cause dispersion or scattering of the transmitted light. In addition, an optical waveguide should allow only preselected modes of light to propagate along the fiber.

A very thorough and complete discussion concerning the operational theories of optical waveguides is contained in U.S. Pat. No. 3,157,726 issued to Hicks et al. and in the publication "Cylindrical Dielectric Waveguide Mode" by E. Snitzer, *Journal of the Optical Society of America*, Vol. 51, No. 5, pages 491–498, May 1961. Another excellent source of information concerning optical waveguides is *Fiber Optics - Principles and Applications* by N. S. Kapany, Academic Press, 1967.

Optical waveguides are a unique type of optical fiber in that many of the physical characteristics and parameters must be carefully coordinated. In the conventional optical fiber substantially all of the transmitted light is retained within the core, and the light transmission qualities of the cladding layer are therefore of no consequence. Some fibers, in fact, are purposely produced with a core possessing good transmission qualities and a cladding layer that is highly absorptive. In order to prevent transmitted light from escaping the fiber, one of the more basic considerations in producing conventional optical fibers is that the index of refraction of the core be larger than the index of refraction of the cladding layer. In fact, if the difference between the two indices of refraction is increased, the amount of light escaping from the fiber will decrease. Therefore, it is common practice in the production of conventional fibers to make the difference between the two indices of refraction as large as possible. However, as is explained by N. S. Kapany if an optical fiber is to function as an optical waveguide, that is, limiting the transmitted light to preselected modes, the diameter of the core, the index of refraction of the core and the index of refraction of the cladding layer must be carefully coordinated. An abbreviated and simplified discussion of optical waveguide theory follows so as to assist understanding of this invention.

Explanations of the physics of electrical and magnetic microwave transmission are often based on the concept that such waves are made up of an infinite number of modes. Each of these modes has its own propagation and distribution characteristics. The propagation of light waves is governed by the same laws of physics that govern microwave propagation and therefore can also be studied in terms of modes.

Since each mode of light traveling along a glass fiber structure propagates at its own characteristic velocity it can be shown that if the same information is initially supplied to all modes there will be a dispersion of this information after a given length of fiber due to the different propagation velocities. It then follows that if light propagation along the optical fiber could be restricted to preselected modes, more effective information transmission would result.

The conditions under which propagation of a particular mode will no longer be localized within the core of an optical fiber can be expressed in terms of a cutoff value U. An exceptionally complex equation, and an explanation thereof, from which the value of U for a particular mode can be determined may be found on page 55 of *Fiber Optics - Principles and Applications* by N. S. Kapany. On the same page of this book Kapany expresses a "fiber characteristic term" — "R" in terms of the optical fiber variables by the equation $$R = (2\pi a/\lambda) \sqrt{n_1^2 - n_2^2} \qquad 1.$$

where $a$ = core radius of the waveguide
$\lambda$ = wavelength of light to be transmitted
$n_1$ = core index of refraction
$n_2$ = cladding index of refraction which can be rewritten as $$R = (2\pi a/\lambda) \sqrt{(n_1 + n_2)(n_1 - n_2)} \qquad 2.$$

Then as is explained in Kapany, for a particular mode to propagate within an optical fiber having a particular "fiber characteristic term" —R, R must be greater than or equal to the cutoff value U for said mode.

The mode $HE_{11}$, the definition and physical characteristics of which can be found in the aforementioned cited sources, is the only mode of light that will propagate along a fiber which has an R value of less than 2.405. Therefore, if R is set equal to 2.405, and equation (2) is evaluated it can be seen that a method of limiting light propagation of a desired wavelength to one mode is to coordinate the parameters $a$, $n_1$ and $n_2$ of the waveguide. That is, if the difference between the two indices of refraction $(n_1 - n_2)$ increases, the core radius $a$ must decrease and if $(n_1 - n_2)$ decreases the core radius $a$ must increase. Producing waveguides having core and cladding indices of refraction within limits necessary to maintain single mode propagation is difficult even for waveguides with very small cores. The difficulty is markedly increased in producing waveguides with larger cores. As an example, if the optical waveguide is to have a small core, that is a core diameter of approximately one micron, the required difference in the two indices of refraction will be on the order of $10^{-2}$; and if the optical waveguide is to have a large core, that is a core diameter of approximately 1 millimeter, the required difference in the two indices of refraction would be even smaller; that is, on the order of $10^{-4}$. The difficulty of very accurately controlling the diameter of the core, the index of refraction of the core and the index of refraction of the cladding layer has in the past made the production of optical waveguides very slow and expensive.

SUMMARY OF THE INVENTION

It is an object of this invention to provide an economical and more easily-formed optical waveguide that overcomes the heretofore noted disadvantages.

Another object of this invention is to provide an optical waveguide that will not absorb an excessive amount of transmitted light.

Briefly, according to this invention, an optical waveguide is produced comprising a cladding layer formed substantially from pure fused silica, and a core formed from fused silica doped with one or more doping materials so as to selectively increase the index of refraction above that of the cladding.

DETAILED DESCRIPTION OF THE INVENTION

Figure 1:
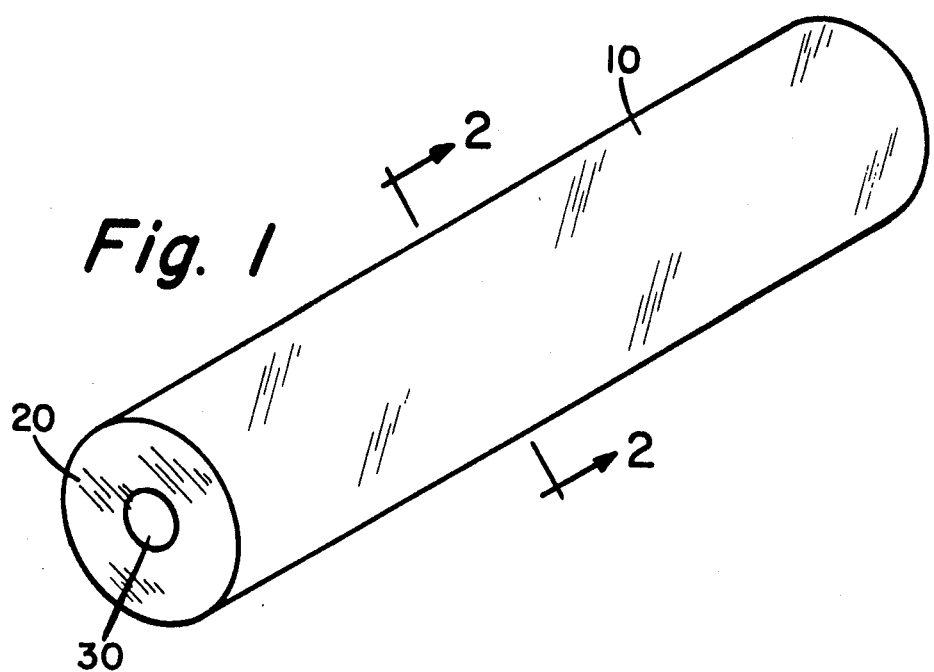
FIG. 1 shows an oblique view of an optical waveguide in accordance with the invention.
Figure 2:
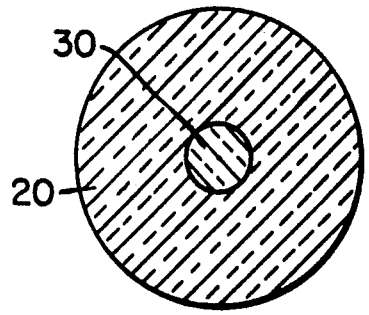
FIG. 2 shows a sectional view taken at lines 2—2 of FIG. 1.

According to this invention a completely new and novel approach has been taken as to the type of material to be used in the production of optical waveguides. Contrary to the soft and easily worked materials normally used in the production of optical waveguides, I have discovered that substantially pure fused silica which is extremely hard and difficult to work can be economically and readily used as material from which a superior optical waveguide can be produced. The term "pure fused silica" when used herein is hereby defined as fused silica containing no impurities in an amount greater than 0.1 percent by weight except for hydrogen-oxygen groups which may be present in amounts up to 5 percent by weight. The following discussion is set out to aid understanding as to why fused silica, apparently so unsuitable, is in reality an excellent material for this purpose. Many of the difficulties normally encountered in the formation of waveguides can be substantially eliminated if both the core and the cladding layer possess similar physical characteristics such as, viscosity, softening point and coefficient of expansion. Further, if a very small yet precise difference can be maintained between the index of refraction of the core and the index of refraction of the cladding layer the diameter of the core may be made proportionally larger and therefore more easily controlled, and the waveguide will still maintain the ability to limit light propagation to preselected modes. Fused silica is readily attainable with exceptionally high purity, and it has been found that fused silica in such pure form has a very predictable index of refraction. Therefore, adding a precise percentage by weight of doping materials to fused silica will produce "doped fused silica" with an index of refraction predictably higher than that of pure fused silica, and because of its high purity level only a minimal amount of doping material will be necessary to cause an appreciable change in the index of refraction. Referring to FIGS. 1 and 2, there is shown an optical waveguide 10 having a cladding layer 20 and a core 30. According to this invention pure fused silica or slightly doped fused silica is used as the cladding layer 20, and fused silica doped with the necessary amount of dopant to increase the index of refraction to a desired level above that of the cladding layer is the material used for the core 30. As a result of the minimum amount of dopant material necessary to increase the index of refraction of fused silica, at any given temperature, the physical characteristics of the doped fused silica, such as viscosity, softening point and coefficient of expansion, used for the core 30, are almost identical to the more nearly pure fused silica used for the cladding layer 20, thereby substantially eliminating many of the difficulties in drawing the waveguide and also reducing the possibility of devitrification. To make certain that doped fused silica possesses optical and physical characteristics almost identical to those of pure fused silica, doping materials should not exceed 15 percent by weight.

In addition, fused silica has excellent light transmission qualities in that absorption of light energy and intrinsic scattering of light by the material is exceptionally low. Scattering of light that does occur within fused silica is primarily caused by the presence of impurities rather than the intrinsic nature of the material itself. Furthermore, fused silica is such a hard material that an optical waveguide once formed possesses the quality of being highly resistant to damage from high temperatures, corrosive atmosphere and other severe environments.

A waveguide possessing a pure fused silica cladding, and a doped fused silica core may be produced by any suitable method including but not limited to: (a) inserting a rod of fused silica, doped as required to increase the index of refraction to the desired level above that of pure fused silica, into a tube of pure fused silica, raising the temperature of the rod and tube combination until said combination has a low enough viscosity for drawing, and then drawing said rod and tube until the tube collapses around and fuses to the rod and the cross-sectional area of the combination is decreased to the desired dimension; or (b) the method set out in co-pending application "Method of Producing Optical Waveguide Fibers" by Donald B. Keck and Peter C. Schultz, Ser. No. 36,267, filed on May 11, 1970, and assigned to a common assignee, which method comprises first forming a film of doped fused silica on the inside wall of a tube of pure fused silica, and then drawing this composite structure to reduce the cross-sectional area and to collapse the film of doped fused silica to form a fiber having a solid cross-section of the desired diameter.

There are many dopant materials that can be added to fused silica in minute quantities to increase its index of refraction to a predetermined level. However, the diffusion properties of the dopant material must be considered. For most methods of producing optical waveguides suitable dopants are those having minimum diffusion properties so that the dopant will not diffuse out of the core and into the cladding layer. Such diffusion would effectively increase the diameter of the core and thereby alter the mode selection abilities of the waveguide. Suitable dopants having minimum diffusion properties include, for example, such multivalent metal oxides as titanium oxide, tantalum oxide, tin oxide, niobium oxide, zirconium oxide, ytterbium oxide, lanthanum oxide, and aluminum oxide. However, in certain methods of producing optical waveguides the core is drawn with a small diameter, and subsequent diffusion increases the core diameter to the desired size. Doping materials containing alkali ions will readily diffuse into the fused silica cladding of an optical waveguide and increase the effective core diameter. Cesium and rubidium are examples of especially suitable materials for such use.

In one embodiment of the present invention, pure fused silica is used as the cladding material, and fused silica doped with a desired doping material or combination of doping materials in the amount effective to increase the index of refraction to the desired level above that of the cladding layer is used as the core material.

In a second embodiment, fused silica slightly doped with a desired doping material or combination of doping materials is used as the cladding material, and fused silica more heavily doped with a desired doping material or a combination of doping materials, either the same or different than those used in the cladding, to increase the index of refraction to the desired level above that of the cladding layer is used as the core material.

It has been found that light absorption properties may be decreased and light transmission qualities improved in titanium oxide doped fused silica formed into optical wave-guides, if the waveguides are drawn in an oxygen atmosphere and then "heat treated" in an oxygen atmosphere. The "heat treatment" referred to consists of heating the waveguide in an oxygen atmosphere to between 500° and 1,000° C for not less than thirty minutes; the length of treatment being related to the treatment temperature. Lower temperatures require longer treatment periods, while treatment at the higher temperature allows shorter time periods.

A specific example of a waveguide produced by the practice of this invention follows. A 1½ to 2 micron film of fused silica doped with titanium oxide was bonded to the inside wall of a ¾ inch outside diameter, ¼ inch inside diameter, substantially pure fused silica tube by the method described in said co-pending Keck-Schultz application. The deposited doped fused silica essentially consisted of 94.75 percent fused silica and 5.25 percent titanium oxide. The composite structure was then heated in substantially an oxygen atmosphere until it reached a temperature at which the materials had low enough viscosity for drawing (approximately 1,900° C). The composite structure was then drawn to reduce the diameter thereof until the film of titanium oxide doped fused silica was collapsed, that is, it sealed the longitudinal hole to form a solid core surrounded by pure fused silica. The resulting composite rod was then further drawn to reduce the diameter thereof to a final diameter of approximately 100 microns. The core of the optical waveguide was measured at approximately 3 microns in diameter. The core index of refraction was approximately 1.466 while the cladding had an index of refraction of approximately 1.4584. After the fiber was drawn, it was heat treated at 800° C in an oxygen atmosphere for approximately three hours.

Although the present invention has been described with respect to specific limitations, it is not intended that these limitations affect the scope of the invention except insofar as set forth in the following claims.

I claim:
1. An optical waveguide comprising
   a cladding layer formed of a material selected from the group consisting of pure fused silica and fused silica to which a dopant material on at least an elemental basis has been added, and a core formed of fused silica to which a dopant material on at least an elemental basis has been added to a degree in excess of that of the cladding layer so that the index of refraction thereof is of a value greater than the index of refraction of said cladding layer, said core being formed of at least 85 percent by weight of fused silica and an effective amount up to 15 percent by weight of said dopant material.
2. The waveguide of claim 1 wherein the cladding layer is substantially pure fused silica.
3. The waveguide of claim 9 wherein the core is formed of at least 94.75 percent by weight of fused silica and an effective amount up to 5.25 percent titanium oxide.
4. An optical waveguide comprising
   a cladding layer formed of a material selected from the group consisting of pure fused silica and doped fused silica, and
   a core formed of fused silica doped to a degree in excess of that of the cladding layer so that the index of refraction thereof is of a value greater than the index of refraction of said cladding layer, said core being doped with at least one multivalent metal oxide selected from the group consisting of titanium oxide, tantalum oxide, tin oxide, niobium oxide, zirconium oxide, ytterbium oxide, lanthanum oxide, and aluminum oxide.
5. An optical waveguide comprising
   a cladding layer formed of a material selected from the group consisting of pure fused silica and doped fused silica, and
   a core formed of fused silica doped to a degree in excess of that of the cladding layer so that the index of refraction thereof is of a value greater than the index of refraction of said cladding layer, said core being doped with at least one material selected from the group consisting of cesium and rubidium.
6. An optical waveguide comprising
   a cladding layer formed of fused silica doped with at least one multivalent metal oxide selected from the group consisting of titanium oxide, tantalum oxide, tin oxide, niobium oxide, zirconium oxide, ytterbium oxide, lanthanum oxide, and aluminum oxide, and
   a core of fused silica doped to a degree in excess of that of the cladding layer so that the index of refraction thereof is of a value greater than the index of refraction of said cladding layer.
7. An optical waveguide comprising
   a cladding layer formed of fused silica doped with at least one material selected from the group consisting of cesium and rubidium, and
   a core formed of a fused silica doped to a degree in excess of that of the cladding layer so that the index of refraction thereof is of a value greater than the index of refraction of said cladding layer.
8. An optical waveguide comprising
   a cladding layer formed of fused silica doped with titanium oxide, and
   a core formed of fused silica doped to a degree in excess of that of the cladding layer so that the index of refraction thereof is of a value greater than the index of refraction of said cladding layer, said core being doped with titanium oxide.
9. An optical waveguide comprising
   a cladding layer formed of substantially pure fused silica, and
   a core formed of fused silica doped to a degree so that the index of refraction thereof is of a value greater than the index of refraction of said cladding layer, said core being doped with titanium oxide.
10. An optical waveguide comprising
    a cladding layer formed of substantially pure fused silica, and
    a core formed of fused silica doped to a degree so that the index of refraction thereof is of a value greater than the index of refraction of said cladding layer, said core being doped with at least one material selected from the group consisting of cesium and rubidium.

* * * * *

PO-1050
(5/69)

UNITED STATES PATENT OFFICE
CERTIFICATE OF CORRECTION

Patent No. 3,659,915          Dated May 2, 1972

Inventor(s) Robert D. Maurer and Peter C. Schultz

It is certified that error appears in the above-identified patent and that said Letters Patent are hereby corrected as shown below:

In the Abstract, line 2, delete "plurality" and instead insert -- purity --.

Claim 3, line 1, delete "9" and instead insert -- 1 --.

Signed and sealed this 9th day of January 1973.

(SEAL)
Attest:

EDWARD M. FLETCHER, JR.
Attesting Officer

ROBERT GOTTSCHALK
Commissioner of Patents